United States Patent
Vo et al.

(10) Patent No.: US 12,474,766 B2
(45) Date of Patent: Nov. 18, 2025

(54) PROVIDING GUIDANCE REGARDING CONTENT VIEWED VIA AUGMENTED REALITY DEVICES

(71) Applicant: Meta Platforms Technologies, LLC, Menlo Park, CA (US)

(72) Inventors: Michelle Tuyet Vo, San Francisco, CA (US); Nadine Sharon Anglin, Los Angeles, CA (US); Aminata Dia, Redwood City, CA (US); Anjali Induchoodan Menon, Redmond, WA (US); Sweta Kothari, Fremont, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 114 days.

(21) Appl. No.: 17/671,986

(22) Filed: Feb. 15, 2022

(65) Prior Publication Data

US 2023/0259193 A1 Aug. 17, 2023

(51) Int. Cl.
| | |
|---|---|
| *G06F 3/01* | (2006.01) |
| *G02B 27/01* | (2006.01) |
| *G06F 16/40* | (2019.01) |
| *G06F 16/9536* | (2019.01) |
| *G06T 7/80* | (2017.01) |
| *G06V 20/20* | (2022.01) |

(52) U.S. Cl.
CPC .......... *G06F 3/011* (2013.01); *G02B 27/0101* (2013.01); *G06F 16/40* (2019.01); *G06F 16/9536* (2019.01); *G06T 7/85* (2017.01); *G06V 20/20* (2022.01); *G02B 2027/0138* (2013.01)

(58) Field of Classification Search
CPC ...... G06F 3/011; G06F 16/40; G06F 16/9536; G06T 7/85; G06V 20/20
See application file for complete search history.

(56) References Cited

U.S. PATENT DOCUMENTS

| | | | |
|---|---|---|---|
| 2017/0206691 A1* | 7/2017 | Harrises | G02B 27/0172 |
| 2018/0040004 A1* | 2/2018 | Greenberger | H04L 67/535 |
| 2018/0300046 A1* | 10/2018 | Goyal | G06F 16/532 |
| 2021/0327156 A1 | 10/2021 | Bramwell et al. | |

OTHER PUBLICATIONS

EPO—International Search Report and Written Opinion for International Application No. PCT/US2023/013091, mailed Jul. 12, 2023, 17 pages.
EPO—Invitation to Pay Additional Fees for International Application No. PCT/US2023/013091, May 17, 2023, 12 pages.

* cited by examiner

*Primary Examiner* — Grace Q Li
(74) *Attorney, Agent, or Firm* — Morgan, Lewis & Bockius LLP

(57) ABSTRACT

Methods, systems, and storage media for providing feedback regarding augmented reality device content are disclosed. Exemplary implementations may: detect, via a sensor of an augmented reality device having an outwardly facing camera, that a user of the augmented reality device appears within content presented in a view area thereof; responsive to detecting that the user of the augmented reality device appears within the content presented in the view area of the augmented reality device, determine an action being performed by the user; and responsive to determining the action being performed by the user, supplement the content presented in the view area of the augmented reality device.

19 Claims, 5 Drawing Sheets

PROVIDING GUIDANCE REGARDING CONTENT VIEWED VIA AUGMENTED REALITY DEVICES

TECHNICAL FIELD

The present disclosure generally relates to content viewed via augmented reality devices. More particularly, the present disclosure relates to providing guidance, feedback and/or information as a supplement to content viewed via augmented reality devices.

BACKGROUND

Augmented and/or virtual reality devices are becoming increasingly commonplace in modern society. As the use of such devices becomes more mainstream, increased opportunities for using augmented and/or virtual content to aid users of such devices with tasks and activities are presented.

BRIEF SUMMARY

The subject disclosure provides for systems and methods for providing guidance and/or feedback as a supplement to content viewed via augmented reality ("AR") devices. In some embodiments, it may be detected, via at least one sensor of an AR device having at least one outwardly facing camera coupled therewith, that an individual using the AR device appears within content presented in a view area of the AR device. In some aspects, the individual using the AR device may appear within the content presented in the view area thereof because the individual is positioned in front of a reflective surface (e.g., a mirror) and is thus able to view themselves in the content presented in the view area of the AR device. Responsive to detecting that the user of the AR device appears within the content presented in the view area thereof, an action being performed by the user may be determined. By way of non-limiting example, it may be determined that the user is brushing their teeth. By way of non-limiting example, it may be determined that the user is playing a guitar. Responsive to determining the action being performed by the user, the content presented in the view area of the AR device may be supplemented, e.g., with guidance and/or feedback regarding the action being performed. By way of non-limiting example, responsive to determining that the user is brushing their teeth, the content within the view area of the AR device may be supplemented with a reminder (e.g., a textual, audio, and/or video reminder) for the user to schedule their next dental appointment. By way of non-limiting example, responsive to determining that the user is playing the guitar, the content in the view area of the AR device may be supplemented with sheet music for the piece being played or instruction for enhancing or improving the user's guitar play.

One aspect of the present disclosure relates to a method for providing feedback regarding augmented reality device content. The method may detecting, via a sensor of an augmented reality device having an outwardly facing camera, that a user of the augmented reality device appears within content presented in a view area of the augmented reality device. Responsive to detecting that the user of the augmented reality device appears within the content presented in the view area of the augmented reality device, the method may include determining an action being performed by the user. Responsive to determining the action being performed by the user, the method may include supplementing the content presented in the view area of the augmented reality device.

Yet another aspect of the present disclosure relates to a non-transient computer-readable storage medium having instructions embodied thereon, the instructions being executable by one or more processors to perform a method for providing feedback regarding augmented reality device content. The method may include detecting, via a sensor of a wearable, head-mounted augmented reality device having an outwardly facing camera, that a user of the wearable, head-mounted augmented reality device appears within content presented in a view area of the wearable, head-mounted augmented reality device. Responsive to detecting that the user of the wearable, head-mounted augmented reality device appears within the content presented in the view area of the wearable, head-mounted augmented reality device, the method may include determining an action being performed by the user. Responsive to determining the action being performed by the user, the method may include supplementing the content presented in the view area of the wearable, head-mounted augmented reality device.

Still another aspect of the present disclosure relates to a system configured for providing feedback regarding augmented reality device content. The system may include means for detecting, via a sensor of an augmented reality device having an outwardly facing camera, that a user of the augmented reality device appears within content presented in a view area of the augmented reality device. The system may include, responsive to detecting that the user of the augmented reality device appears within the content presented in the view area of the augmented reality device, means for determining an action being performed by the user. Responsive to determining the action being performed by the user, the system may include means for supplementing the content presented in the view area of the augmented reality device.

In some embodiments, it may be detected, via at least one sensor of the AR device having at least one outwardly facing camera, that the user of the AR device is present at a landmark and/or other structure/location of general interest. An indication that a visual image including the landmark and/or other structure/location of general interest is to be captured via the outwardly facing camera of the AR device may be received. Based, at least in part, on detecting that the user of the AR device is present at a landmark and/or other structure/location of general interest and receiving the indication that a visual image is to be captured, at least one best practice for capturing the visual image such that the visual image includes the landmark may be determined. In some aspects, the at least one best practice may be determined based upon an image history associated with the user of the AR device. In some aspects, the at least one best practice may be determined based upon images of the landmark captured by a plurality of augmented reality device users. The at least one best practice for capturing the visual image such that the visual image includes the landmark may be caused to be communicated to the user, e.g., by way of textual, audio, and/or video instruction that supplements the content presented in the view area of the AR device.

One aspect of the present disclosure relates to a system configured for providing suggestions for capturing visual images of landmarks via augmented reality devices. The system may include one or more hardware processors configured by machine-readable instructions. The processor(s) may be configured to detect, via a sensor of an augmented reality device having an outwardly facing camera, that a user of the augmented reality device is present at a landmark. The processor(s) may be configured to receive an indication that a visual image is to be captured via the outwardly facing camera of the augmented reality device. Based, at least in part, on detecting that the user of the augmented reality device is present at a landmark and receiving the indication that the visual image is to be captured, the processor(s) may be configured to determine at least one best practice for capturing the visual image such that the visual image includes the landmark. The processor(s) may be configured to cause the at least one best practice for capturing the visual image such that the visual image includes the landmark to be communicated to the user.

Another aspect of the present disclosure relates to a system configured for providing suggestions for capturing visual images of landmarks via augmented reality devices. The system may include means for detecting, via a sensor of an augmented reality device having an outwardly facing camera, that a user of the augmented reality device is present at a landmark. The system may include means for receiving an indication that a visual image is to be captured via the outwardly facing camera of the augmented reality device. Based, at least in part, on detecting that the user of the augmented reality device is present at a landmark and receiving the indication that the visual image is to be captured, the system may include means for determining at least one best practice for capturing the visual image such that the visual image includes the landmark. The system may include means for causing the at least one best practice for capturing the visual image such that the visual image includes the landmark to be communicated to the user.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

Augmented and/or virtual reality (AR/VR) devices are becoming increasingly commonplace in modern society. As the use of such AR/VR devices becomes more mainstream, increased opportunities for using augmented and/or virtual content to aid users of such AR/VR devices with tasks and activities are presented. (It will be understood and appreciated by those having ordinary skill in the art that any use of the terms "augmented reality," "virtual reality," "augmented and/or virtual reality," or the like in the present disclosure is intended to encompass both virtual and augmented reality.)

Figure 1:
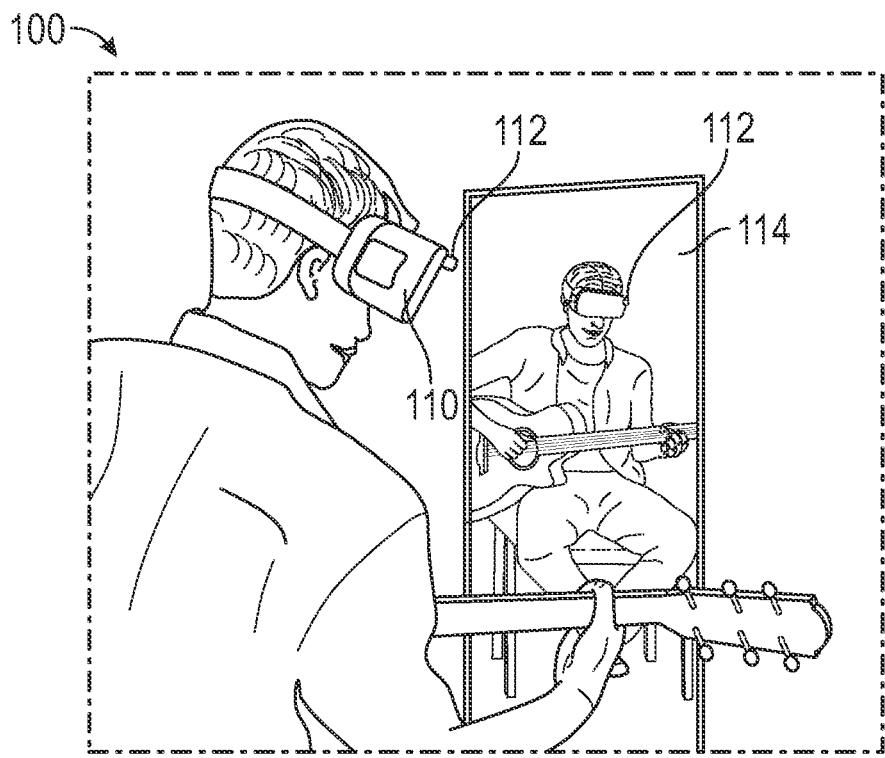
FIG. 1 is a schematic diagram illustrating an individual wearing a head-mounted AR/VR device and standing in front of a reflective surface, according to certain aspects of the present disclosure.

The subject disclosure provides for systems and methods for providing guidance, feedback, and/or information as a supplement to content viewed via augmented reality ("AR") devices. In some embodiments, it may be detected, via at least one sensor of an AR device having at least one outwardly facing camera coupled therewith, that an individual using the AR device appears within content presented in a view area of the AR device. In some aspects, the individual using the AR device may appear within the content presented in the view area thereof because the individual is positioned in front of a reflective surface (e.g., a mirror) and is thus able to view themselves in the content presented in the view area of the AR device. The schematic diagram 100 of FIG. 1 illustrates an individual wearing a head-mounted AR device 110 having an outwardly facing camera/sensor 112 and standing in front of a reflective surface 114, according to certain aspects of the present disclosure. As the user shown in FIG. 1 is looking in the direction of the reflective surface 114, the user may appear within the content presented in the view area of the AR device 110.

Responsive to detecting that the user of the AR device appears within the content presented in the view area thereof, an action being performed by the user may be determined. By way of non-limiting example, it may be determined that the user is brushing their teeth. By way of non-limiting example, it may be determined that the user is playing a guitar. Responsive to determining the action being performed by the user, the content presented in the view area of the AR device may be supplemented, e.g., with guidance, feedback and/or information regarding the action being performed. By way of non-limiting example, responsive to determining that the user is brushing their teeth, the content within the view area of the AR device may be supplemented with a reminder (e.g., a textual, audio, and/or video reminder) for the user to schedule their next dental appointment. By way of non-limiting example, responsive to determining that the user is playing the guitar, the content in the view area of the AR device may be supplemented with sheet music for the piece being played or instruction for enhancing or improving the user's guitar play.

Figure 2:
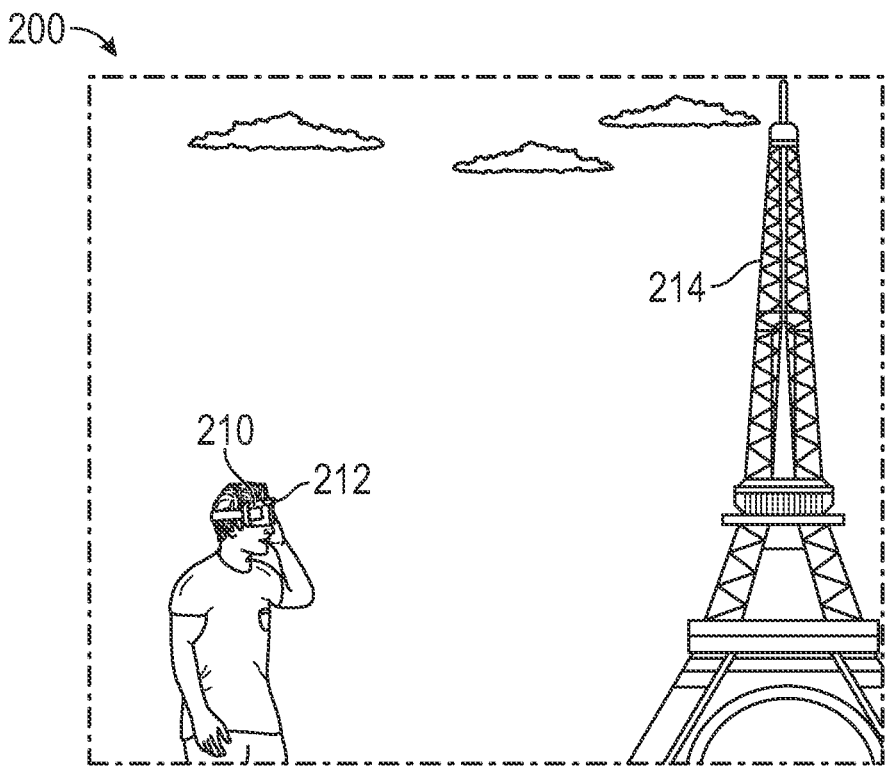
FIG. 2 is a schematic diagram illustrating an individual wearing a head-mounted AR/VR device and gazing in the direction of a landmark or other structure/location of interest, according to certain aspects of the present disclosure.

In some embodiments, it may be detected, via at least one sensor of the AR device having at least one outwardly facing camera, that the user of the AR device is present at a landmark and/or other structure/location of general interest. (It will be understood and appreciated by those having ordinary skill in the relevant art that use of the term "landmark" herein is intended to include any structure or location formally designated as a landmark, as well as any structure or location noted to be of interest by the user of the AR device or by a plurality of individuals that have visited the landmark/structure/location in question.) In non-limiting aspects, it may be detected that a user is present at the landmark responsive to detecting that a landmark appears within a view area of the AR device. The schematic diagram 200 of FIG. 2 illustrates an individual wearing a head-mounted AR device 210 having an outwardly facing camera/sensor 212 and gazing in the direction of a landmark 214, according to certain aspects of the present disclosure. As the user is gazing in the direction of the landmark 214, the landmark 214 may appear within content presented in the view area of the AR device 210.

An indication that a visual image including the landmark is to be captured via the outwardly facing camera of the AR device may be received. In non-limiting aspects, such indication may be received via verbal command by the user that is detected via a sensor coupled with the AR device. Based, at least in part, on detecting that the user of the AR device is present at a landmark and receiving the indication that a visual image is to be captured, at least one best practice for capturing the visual image such that the visual image includes the landmark may be determined. In some aspects, the at least one best practice may be determined based upon an image history associated with the user of the AR device. In some aspects, the at least one best practice may be determined based upon images of the landmark captured by a plurality of augmented reality device users. The at least one best practice for capturing the visual image such that the visual image includes the landmark may be caused to be communicated to the user, e.g., by way of textual, audio, and/or video instruction that supplements the content presented in the view area of the AR device.

Figure 3:
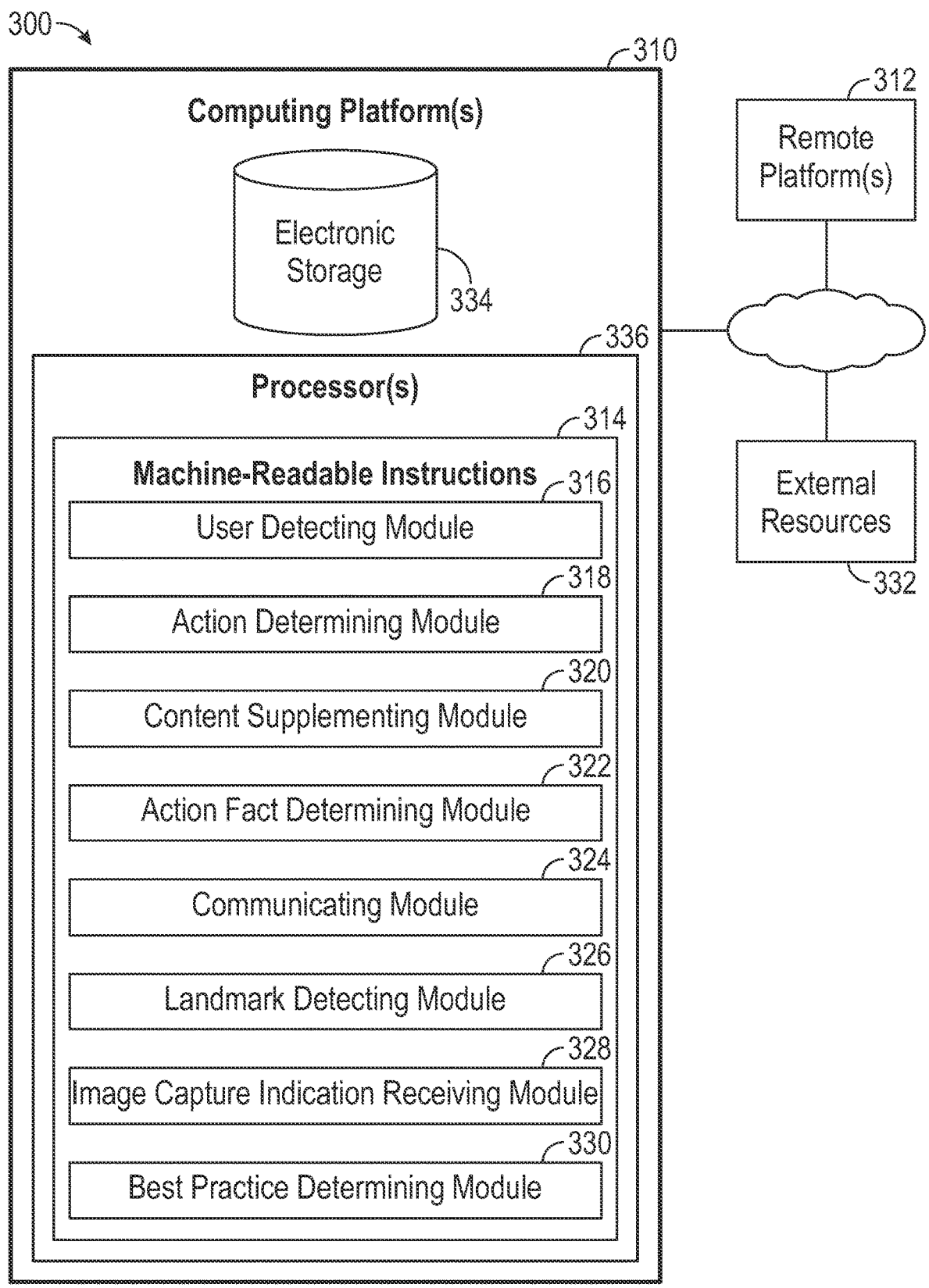
FIG. 3 is a schematic diagram illustrating a system configured for providing feedback regarding AR/VR device content and for capturing visual images of landmarks via AR/VR devices, in accordance with one or more implementations.

FIG. 3 illustrates a system 300 configured for a system configured for providing feedback regarding AR/VR device content and for capturing visual images of landmarks via AR/VR devices, according to certain aspects of the disclosure. In some implementations, system 300 may include one or more computing platforms 310. Computing platform(s) 310 may be configured to communicate with one or more remote platforms 312 according to a client/server architecture, a peer-to-peer architecture, and/or other architectures. Remote platform(s) 312 may be configured to communicate with other remote platforms via computing platform(s) 310 and/or according to a client/server architecture, a peer-to-peer architecture, and/or other architectures. Users may access system 300 via remote platform(s) 312.

Computing platform(s) 310 may be configured by machine-readable instructions 314. Machine-readable instructions 314 may include one or more instruction modules. The instruction modules may include computer program modules. The instruction modules may include one or more of user detecting module 316, action determining module 318, content supplementing module 320, action fact determining module 322, communicating module 324, landmark detecting module 326, image capture indication receiving module 328, best practice determining module 330, and/or other instruction modules.

User detecting module 316 may be configured to detect that a user of an AR device appears within the content presented in a view area thereof. In aspects, user detecting module 316 may be configured to detect that a user of an AR device appears within content presented in a view area thereof via an outwardly facing camera/sensor of the AR device (e.g., the outwardly facing camera/sensor 112 of the AR device 110 of FIG. 1).

Responsive to detecting (e.g., via the user detecting module 316) that a user of an AR device appears within the content presented in the view area thereof, action determining module 318 may be configured to determine an action being performed by the user. In aspects, action determining module 318 may be configured to determine an action being performed by the user via detection of the action using an outwardly facing camera/sensor of the AR device (e.g., the outwardly facing camera/sensor 112 of the AR device 110 of FIG. 1) and querying of a data store for details regarding the nature of the detected action.

Responsive to determining the action being performed by the user, content supplementing module 320 may be configured to supplement the content presented in the view area of the AR device. By way of non-limiting example, supplementing the content presented in the view area of the AR device may include supplementing the content presented in the view area of the AR device with guidance and/or feedback for at least one of improving and enhancing the action being performed by the user. By way of non-limiting example, supplementing the content presented in the view area of the AR device may include supplementing the content presented in the view area of the AR device with at least one of textual content, audio content, and video content containing the guidance and/or feedback for improving and/or enhancing the action being performed by the user.

Action fact determining module 322 may be configured to determine, based on at least one of information obtained from a sensor of the AR device, a data store associated with the AR device, and information derived from at least one social networking platform, one or more facts regarding the action being performed by the user. By way of non-limiting example, such facts may include information derived from the user's social networking profile, feed, or the like. For instance, if it is detected that the user is playing the guitar, it may be determined from the user's social networking feed that the user is learning to play a certain piece of music on the guitar. In this instance, a fact regarding the action being performed by the user may be an identity of the piece of music.

Communicating module 324 may be configured to cause at least one of guidance, feedback, information, and/or facts (e.g., determined by action fact determining module 322) to be communicated to a user as a supplement to content viewed via an augmented reality device. In aspects, communicating module 324 may be configured to cause at least one of guidance, feedback, information, and/or facts to be communicated to a user as supplemental text overlaid upon content presented in a view area of an AR device. In aspects, communicating module 324 may be configured to cause at least one of guidance, feedback, information, and/or facts to be communicated to a user as supplemental audio content presented contemporaneously with content in a view area of an AR device. In aspects, communicating module 324 may be configured to cause at least one of guidance, feedback, information, and/or facts to be communicated to a user as supplemental video content presented contemporaneously with content presented in a view area of an AR device.

Landmark detecting module 326 may be configured to detect that a user of an AR device is present at a landmark. In non-limiting aspects, landmark detecting module 326 may be configured to detect that a user of an AR device is present at a landmark via information obtained by a sensor of an AR reality device. In non-limiting aspects, landmark detecting module 326 may be configured to detect that a user of an AR device is present at a landmark via information obtained by a sensor of an AR reality device having an outwardly facing camera. In non-limiting aspects, it may be detected that a user is present at the landmark responsive to detecting that a landmark appears within a view area of the AR device.

Image capture indication receiving module 328 may be configured to receive an indication that a visual image is to be captured via an AR device. In non-limiting aspects, image capture indication receiving module 328 may be configured to receive an indication that a visual image is to be captured via the outwardly facing camera of an AR device. In non-limiting aspects, an indication may be received by image capture indication receiving module 328 via verbal command by the user that is detected via a sensor coupled with the AR device. In non-limiting aspects, an indication that a visual image is to be captured via an AR device may be received by image capture indication receiving module 328 via a particular action or gesture being performed by a user of an AR device.

Based, at least in part, on detecting that a user of an AR device is present at a landmark and receiving an indication that a visual image is to be captured, best practice determining module 330 may be configured to determine at least one best practice for capturing the visual image such that the visual image includes the landmark. In some non-limiting aspects, the at least one best practice may be determined based upon an image history associated with the user of the AR device. In some non-limiting aspects, the at least one best practice may be determined based upon images of the landmark captured by a plurality of augmented reality device users. In some non-limiting aspects, the at least one best practice may be determined based upon information associated with a plurality of visual images including the landmark captured by a plurality of augmented reality device users. In some non-limiting aspects, the at least one best practice for capturing the visual image such that the visual image includes the landmark may include information regarding positioning of the landmark in relation to the visual image as a whole. In some non-limiting aspects, the at least one best practice for capturing the visual image such that the visual image includes the landmark may include information regarding an angle from which capturing of the visual image is suggested.

In embodiments, communicating module 324 may be configured to cause at least one best practice for capturing a visual image such that the visual image includes a landmark to be communicated to a user as a supplement to content viewed via an augmented reality device.

In some implementations, computing platform(s) 310, remote platform(s) 312, and/or external resources 332 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 310, remote platform(s) 312, and/or external resources 332 may be operatively linked via some other communication media.

A given remote platform 312 may include one or more processors configured to execute computer program modules. The computer program modules may be configured to enable an expert or user associated with the given remote platform 312 to interface with system 300 and/or external resources 332, and/or provide other functionality attributed herein to remote platform(s) 312. By way of non-limiting example, a given remote platform 312 and/or a given computing platform 310 may include one or more of a server, a desktop computer, a laptop computer, a handheld computer, a tablet computing platform, a NetBook, a Smartphone, a gaming console, and/or other computing platforms.

External resources 332 may include sources of information outside of system 300, external entities participating with system 300, and/or other resources. In some implementations, some or all of the functionality attributed herein to external resources 332 may be provided by resources included in system 300.

Computing platform(s) 310 may include electronic storage 334, one or more processors 336, and/or other components. Computing platform(s) 310 may include communication lines, or ports to enable the exchange of information with a network and/or other computing platforms. Illustration of computing platform(s) 310 in FIG. 3 is not intended to be limiting. Computing platform(s) 310 may include a plurality of hardware, software, and/or firmware components operating together to provide the functionality attributed herein to computing platform(s) 310. For example, computing platform(s) 310 may be implemented by a cloud of computing platforms operating together as computing platform(s) 310.

Electronic storage 334 may comprise non-transitory storage media that electronically stores information. The electronic storage media of electronic storage 334 may include one or both of system storage that is provided integrally (i.e., substantially non-removable) with computing platform(s) 310 and/or removable storage that is removably connectable to computing platform(s) 310 via, for example, a port (e.g., a USB port, a firewire port, etc.) or a drive (e.g., a disk drive, etc.). Electronic storage 334 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 334 may include one or more virtual storage resources (e.g., cloud storage, a virtual private network, and/or other virtual storage resources). Electronic storage 334 may store software algorithms, information determined by processor(s) 336, information received from computing platform(s) 310, information received from remote platform(s) 312, and/or other information that enables computing platform(s) 310 to function as described herein.

Processor(s) 336 may be configured to provide information processing capabilities in computing platform(s) 310. As such, processor(s) 336 may include one or more of a digital processor, an analog processor, a digital circuit designed to process information, an analog circuit designed to process information, a state machine, and/or other mechanisms for electronically processing information. Although processor(s) 336 is shown in FIG. 3 as a single entity, this is for illustrative purposes only. In some implementations, processor(s) 336 may include a plurality of processing units. These processing units may be physically located within the same device, or processor(s) 336 may represent processing functionality of a plurality of devices operating in coordination. Processor(s) 336 may be configured to execute modules 316, 318, 320, 322, 324, 326, 328, and/or 330, and/or other modules. Processor(s) 336 may be configured to execute modules 316, 318, 320, 322, 324, 326, 328, and/or 330, and/or other modules by software; hardware; firmware; some combination of software, hardware, and/or firmware; and/or other mechanisms for configuring processing capabilities on processor(s) 336. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 316, 318, 320, 322, 324, 326, 328, and/or 330 are illustrated in FIG. 3 as being implemented within a single processing unit, in implementations in which processor(s) 336 includes multiple processing units, one or more of modules 316, 318, 320, 322, 324, 326, 328, and/or 330 may be implemented remotely from the other modules. The description of the functionality provided by the different modules 316, 318, 320, 322, 324, 326, 328, and/or 330 described below is for illustrative purposes, and is not intended to be limiting, as any of modules 316, 318, 320, 322, 324, 326, 328, and/or 330 may provide more or less functionality than is described. For example, one or more of modules 316, 318, 320, 322, 324, 326, 328, and/or 330 may be eliminated, and some or all of its functionality may be provided by other ones of modules 316, 318, 320, 322, 324, 326, 328, and/or 330. As another example, processor(s) 336 may be configured to execute one or more additional modules that may perform some or all of the functionality attributed below to one of modules 316, 318, 320, 322, 324, 326, 328, and/or 330.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
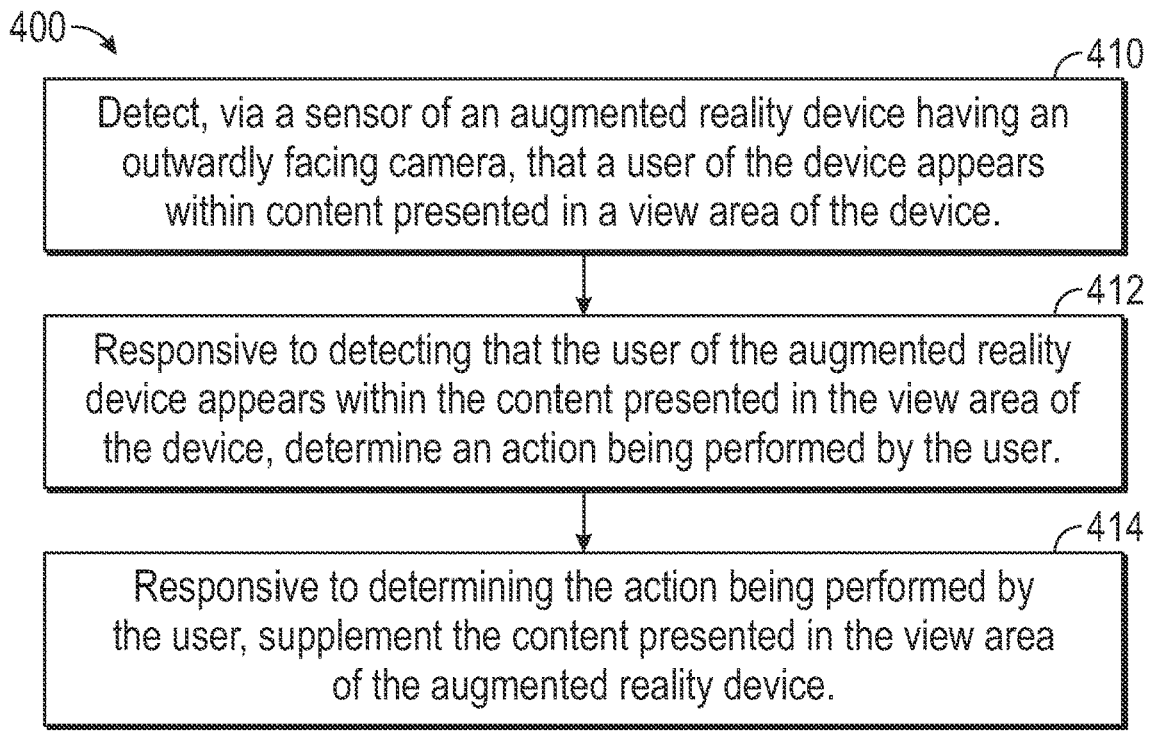
FIG. 4 illustrates an exemplary flow diagram for providing feedback regarding AR/VR device content, according to certain aspects of the disclosure.

FIG. 4 illustrates an exemplary flow diagram (e.g., process 400) for providing feedback regarding AR/VR device content, according to certain aspects of the disclosure. For explanatory purposes, the exemplary process 400 is described herein with reference to FIGS. 1 and 3. Further for explanatory purposes, the steps of the exemplary process 400 are described herein as occurring in serial, or linearly. However, multiple instances of the example process 400 may occur in parallel.

At step 410, the process 400 may include detecting, via a sensor of an augmented reality device having an outwardly facing camera, that a user of the augmented reality device appears within content presented in a view area of the augmented reality device.

At step 412 the process 400 may include responsive to detecting that the user of the augmented reality device appears within the content presented in the view area of the augmented reality device, determining an action being performed by the user.

At step 414, the process 400 may include, responsive to determining the action being performed by the user, supplementing the content presented in the view area of the augmented reality device.

For example, as described above in relation to FIGS. 1 and 3, at step 410, the process 400 may include detecting, via a sensor of an augmented reality device having an outwardly facing camera, (e.g., through user detecting module 316 of the system 300 of FIG. 3) that a user of the augmented reality device appears within content presented in a view area of the augmented reality device. At step 412, the process 400 may include, responsive to detecting that the user of the augmented reality device appears within the content presented in the view area of the augmented reality device, determining an action being performed by the user (e.g., through action determining module 318 of the system 300 of FIG. 3). At step 414, the process 400 may include, responsive to determining the action being performed by the user, supplementing the content presented in the view area of the augmented reality device (e.g., through content supplementing module 320 of the system 300 of FIG. 3).

Figure 5:
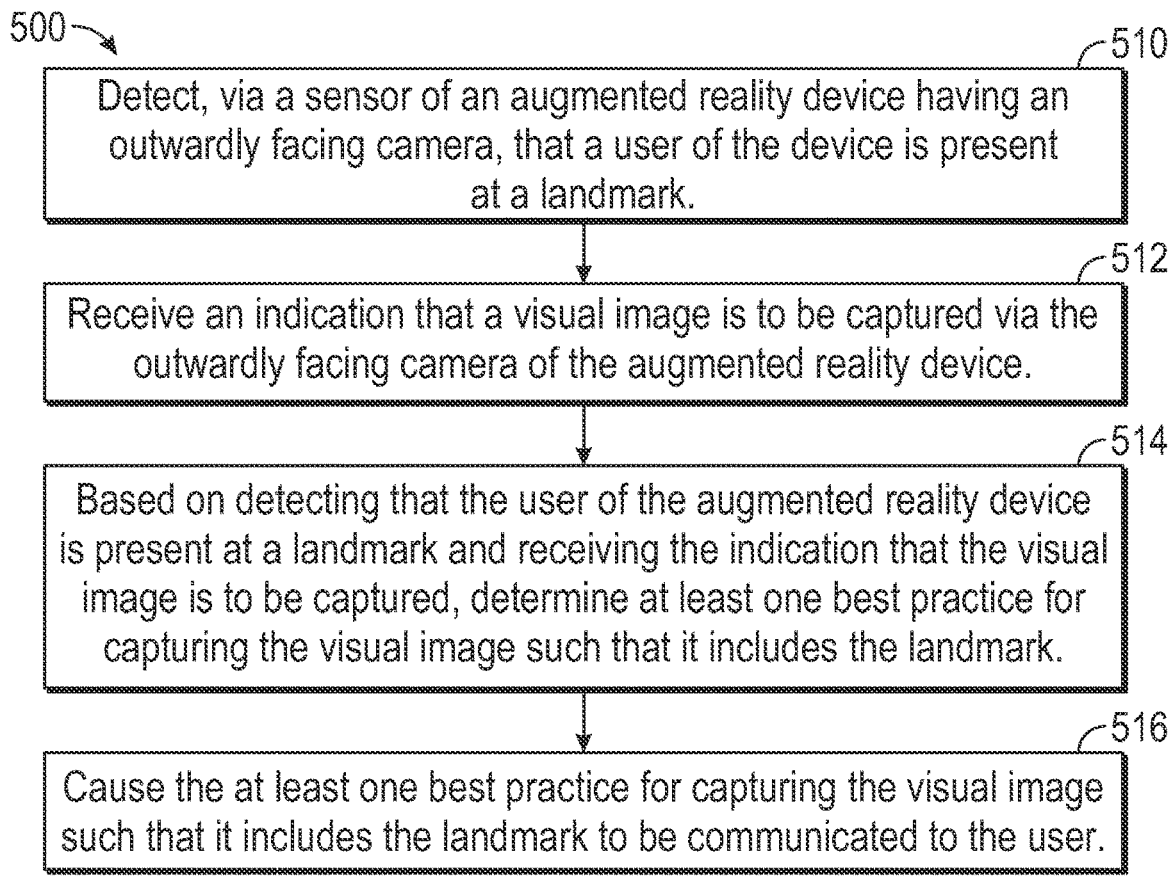
FIG. 5 illustrates an exemplary flow diagram for capturing visual images of landmarks or other structures/locations of interest via AR/VR devices, in accordance with one or more implementations.

FIG. 5 illustrates an exemplary flow diagram for capturing visual images of landmarks or other structures/locations of interest via AR/VR devices, according to certain aspects of the disclosure. For explanatory purposes, the exemplary process 500 is described herein with reference to FIGS. 2 and 3. Further for explanatory purposes, the steps of the exemplary process 500 are described herein as occurring in serial, or linearly. However, multiple instances of the example process 500 may occur in parallel.

At step 510, the process may include detecting, via a sensor of an augmented reality device having an outwardly facing camera, that a user of the augmented reality device is present at a landmark.

At step 512, the process may include receiving an indication that a visual image is to be captured via the outwardly facing camera of the augmented reality device.

At step 514, the process may include, based at least in part on detecting that the user of the augmented reality device is present at a landmark and receiving the indication that the visual image is to be captured, determining at least one best practice for capturing the visual image such that the visual image includes the landmark.

At step 516, the process may include causing the at least one best practice for capturing the visual image such that the visual image includes the landmark to be communicated to the user.

For example, as described above in relation to FIGS. 2 and 3, at step 510, the process 500 may include detecting, via a sensor of an augmented reality device having an outwardly facing camera, (e.g., through landmark detecting module 326 of the system 00 of FIG. 3) that a user of the augmented reality device is present at a landmark. At step 512, the process 500 may include receiving an indication that a visual image is to be captured via the outwardly facing camera of the augmented reality device (e.g., through image capture indication receiving module 328 of the system 300 of FIG. 3). At step 514, the process 500 may include, based at least in part on detecting that the user of the augmented reality device is present at a landmark and receiving the indication that the visual image is to be captured, determining at least one best practice for capturing the visual image such that the visual image includes the landmark (e.g., through best practice determining module 330 of the system 300 of FIG. 3). At step 516, the process 500 may include causing the at least one best practice for capturing the visual image such that the visual image includes the landmark to be communicated to the user (e.g., through communicating module 324 of the system 300 of FIG. 3).

Figure 6:
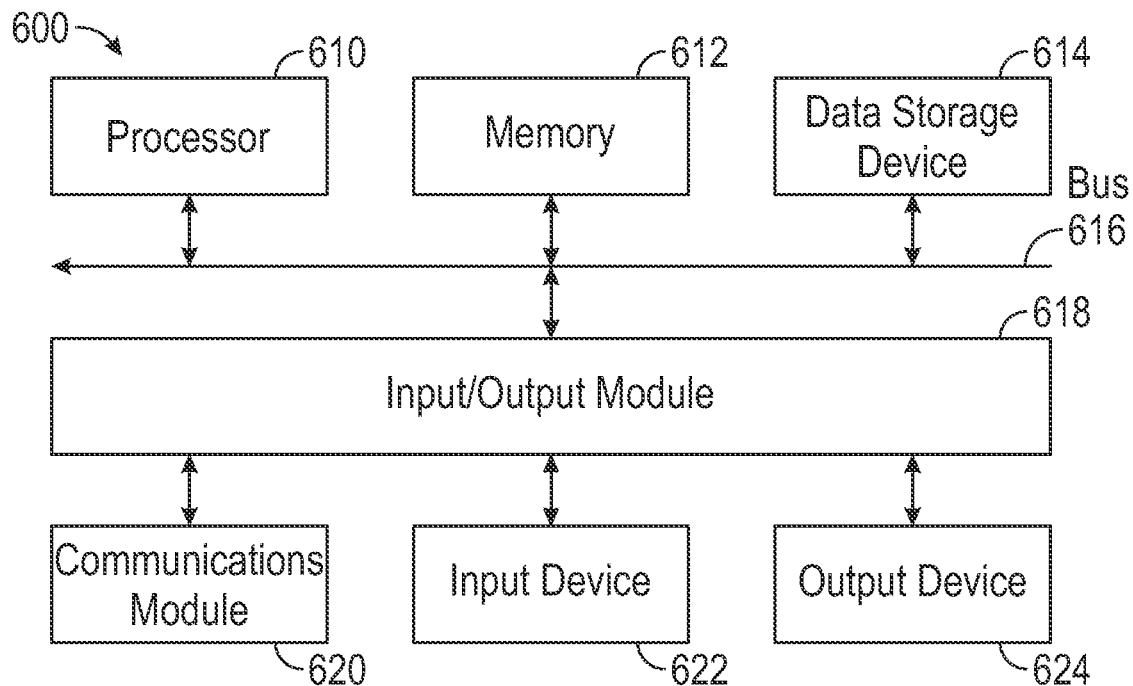
FIG. 6 is a block diagram illustrating an exemplary computer system (e.g., representing both client and server) with which aspects of the subject technology can be implemented.

FIG. 6 is a block diagram illustrating an exemplary computer system 600 with which aspects of the subject technology can be implemented. In certain aspects, the computer system 600 may be implemented using hardware or a combination of software and hardware, either in a dedicated server, integrated into another entity, or distributed across multiple entities.

Computer system 600 (e.g., server and/or client) includes a bus 616 or other communication mechanism for communicating information, and a processor 610 coupled with bus 616 for processing information. By way of example, the computer system 600 may be implemented with one or more processors 610. Processor(s) 610 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 612, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 616 for storing information and instructions to be executed by processor 610. The processor 610 and the memory 612 can be supplemented by, or incorporated in, special purpose logic circuitry.

The instructions may be stored in the memory 612 and implemented in one or more computer program products, i.e., one or more modules of computer program instructions encoded on a computer readable medium for execution by, or to control the operation of, the computer system 600, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 612 may also be used for storing temporary variable or other intermediate information during execution of instructions to be executed by processor 610.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 614 such as a magnetic disk or optical disk, coupled to bus 616 for storing information and instructions. Computer system 600 may be coupled via input/output module 618 to various devices. The input/output module 618 can be any input/output module. Exemplary input/output modules 618 include data ports such as USB ports. The input/output module 618 is configured to connect to a communications module 620. Exemplary communications modules 620 include networking interface cards, such as Ethernet cards and modems. In certain aspects, the input/output module 618 is configured to connect to a plurality of devices, such as an input device 622 and/or an output device 624. Exemplary input devices 622 include a keyboard and a pointing device, e.g., a mouse or a trackball, by which a user can provide input to the computer system 600. Other kinds of input devices 622 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 624 include display devices such as an LCD (liquid crystal display) monitor, for displaying information to the user.

According to one aspect of the present disclosure, the above-described systems can be implemented using a computer system 600 in response to processor 610 executing one or more sequences of one or more instructions contained in memory 612. Such instructions may be read into memory 612 from another machine-readable medium, such as data storage device 614. Execution of the sequences of instructions contained in the main memory 612 causes processor 610 to perform the process steps described herein. One or more processors in a multi-processing arrangement may also be employed to execute the sequences of instructions contained in memory 612. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 610 for execution. Such a medium may take many forms, including, but not limited to, non-volatile media, volatile media, and transmission media. Non-volatile media include, for example, optical or magnetic disks, such as data storage device 614. Volatile media include dynamic memory, such as memory 612. Transmission media include coaxial cables, copper wire, and fiber optics, including the wires that comprise bus 616. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 600 reads data, information may be read from the data and stored in a memory device, such as the memory 612. Additionally, data from the memory 612 servers accessed via a network the bus 616, or the data storage device 614 may be read and loaded into the memory 612. Although data is described as being found in the memory 612, it will be understood that data does not have to be stored in the memory 612 and may be stored in other memory accessible to the processor 610 or distributed among several media, such as the data storage device 614.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as exemplary forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
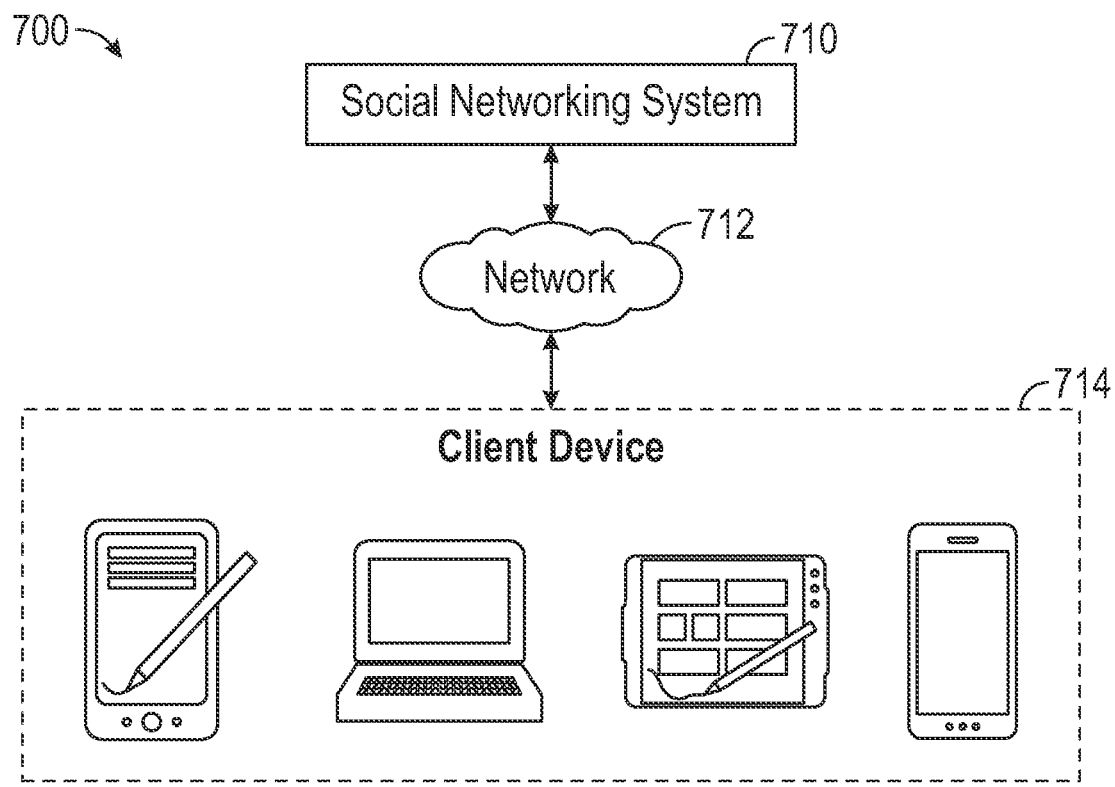
FIG. 7 illustrates an exemplary network environment of a social networking system, in accordance with one or more implementations of the present disclosure.

FIG. 7 illustrates an exemplary network environment 700 of a networking system (e.g., social networking system 710). Network environment 700 includes a client system 714 and a social networking system 710 connected to each other by a network 712. Although FIG. 7 illustrates a particular arrangement of client system 714, social networking system 710, and network 712, this disclosure contemplates any suitable arrangement of client system 714, social networking system 710, and network 712. As an example, and not by way of limitation, two or more of client system 714 and social networking system 710 may be connected to each other directly, bypassing network 712. As another example, two or more of client system 814 and social networking system 710 may be physically or logically co-located with each other in whole or in part. Moreover, although FIG. 7 illustrates a particular number of client systems 714, social networking systems 710, and networks 712, this disclosure contemplates any suitable number of client systems 714, social networking systems 710, and networks 712. As an example, and not by way of limitation, network environment 700 may include multiple client systems 714, social networking systems 710, and networks 712.

This disclosure contemplates any suitable network 712. As an example, and not by way of limitation, one or more portions of network 712 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 712 may include one or more networks 712.

Links may connect client system 714 and social networking system 710 to communication network 712 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 700. One or more first links may differ in one or more respects from one or more second links.

In particular embodiments, client system 714 may be an electronic device including hardware, software, or embedded logic components or a combination of two or more such components and capable of carrying out the appropriate functionalities implemented or supported by client system 714. As an example, and not by way of limitation, a client system 714 may include any of the computing devices discussed above in relation to FIG. 6. A client system 714 may enable a network user at client system 714 to access network 712. A client system 714 may enable its user to communicate with other users at other client systems 714.

In particular embodiments, client system 714 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 714 may enter a Uniform Resource Locator (URL) or other address directing the web browser to a particular server (such as server, or a server associated with a third-party system), and the web browser may generate a Hyper Text Transfer Protocol (HTTP) request and communicate the HTTP request to server. The server may accept the HTTP request and communicate to client system 714 one or more Hyper Text Markup Language (HTML) files responsive to the HTTP request. Client system 714 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 710 may be a network-addressable computing system that can host an online social network. Social networking system 810 may generate, store, receive, and send social networking data, such as, for example, user-profile data, concept-profile data, social-graph information, or other suitable data related to the online social network. Social networking system 710 may be accessed by the other components of network environment 700 either directly or via network 712. In particular embodiments, social networking system 710 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 710 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 714, a social networking system 710, or a third-party system to manage, retrieve, modify, add, or delete, the information stored in data store.

In particular embodiments, social networking system 710 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 710 may provide users of the online social network the ability to communicate and interact with other users. In particular embodiments, users may join the online social network via social networking system 710 and then add connections (e.g., relationships) to a number of other users of social networking system 710 whom they want to be connected to. Herein, the term "friend" may refer to any other user of social networking system 710 with whom a user has formed a connection, association, or relationship via social networking system 710.

In particular embodiments, social networking system 710 may provide users with the ability to take actions on various types of items or objects, supported by social networking system 710. As an example, and not by way of limitation, the items and objects may include groups or social networks to which users of social networking system 710 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 710 or by an external system of a third-party system, which is separate from social networking system 710 and coupled to social networking system 710 via a network 712.

In particular embodiments, social networking system 710 may be capable of linking a variety of entities. As an example, and not by way of limitation, social networking system 710 may enable users to interact with each other as well as receive content from third-party systems or other entities, or to allow users to interact with these entities through an application programming interfaces (API) or other communication channels.

In particular embodiments, a third-party system may include one or more types of servers, one or more data stores, one or more interfaces, including but not limited to APIs, one or more web services, one or more content sources, one or more networks, or any other suitable components, e.g., that servers may communicate with. A third-party system may be operated by a different entity from an entity operating social networking system 710. In particular embodiments, however, social networking system 710 and third-party systems may operate in conjunction with each other to provide social networking services to users of social networking system 710. In this sense, social networking system 710 may provide a platform, or backbone, which other systems, such as third-party systems, may use to provide social networking services and functionality to users across the Internet.

In particular embodiments, a third-party system may include a third-party content object provider. A third-party content object provider may include one or more sources of content objects, which may be communicated to a client system 714. As an example, and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 710 also includes user-generated content objects, which may enhance a user's interactions with social networking system 710. User-generated content may include anything a user can add, upload, send, or "post" to social networking system 710. As an example, and not by way of limitation, a user communicates posts to social networking system 710 from a client system 714. Posts may include data such as status updates or other textual data, location information, photos, videos, links, music or other similar data or media. Content may also be added to social networking system 710 by a third-party through a "communication channel," such as a newsfeed or stream.

In particular embodiments, social networking system 710 may include a variety of servers, sub-systems, programs, modules, logs, and data stores. In particular embodiments, social networking system 710 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 710 may also include suitable components such as network interfaces, security mechanisms, load balancers, failover servers, management-and-network-operations consoles, other suitable components, or any suitable combination thereof. In particular embodiments, social networking system 710 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example, and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 710 to one or more client systems 714 or one or more third-party system via network 712. The web server may include a mail server or other messaging functionality for receiving and routing messages between social networking system 710 and one or more client systems 714. An API-request server may allow a third-party system to access information from social networking system 710 by calling one or more APIs. An action logger may be used to receive communications from a web server about a user's actions on or off social networking system 710. In conjunction with the action log, a third party-content-object log may be maintained of user exposures to third party-content objects. A notification controller may provide information regarding content objects to a client system 714. Information may be pushed to a client system 714 as notifications, or information may be pulled from client system 714 responsive to a request received from client system 714. Authorization servers may be used to enforce one or more privacy settings of the users of social networking system 710. A privacy setting of a user determines how particular information associated with a user can be shared. The authorization server may allow users to opt in to or opt out of having their actions logged by social networking system 710 or shared with other systems, such as, for example, by setting appropriate privacy settings. Third party-content-object stores may be used to store content objects received from third parties, such as a third-party system. Location stores may be used for storing location information received from client systems 714 associated with users. Advertisement-pricing modules may combine social information, the current time, location information, or other suitable information to provide relevant advertisements, in the form of notifications, to a user.

Figure 8:
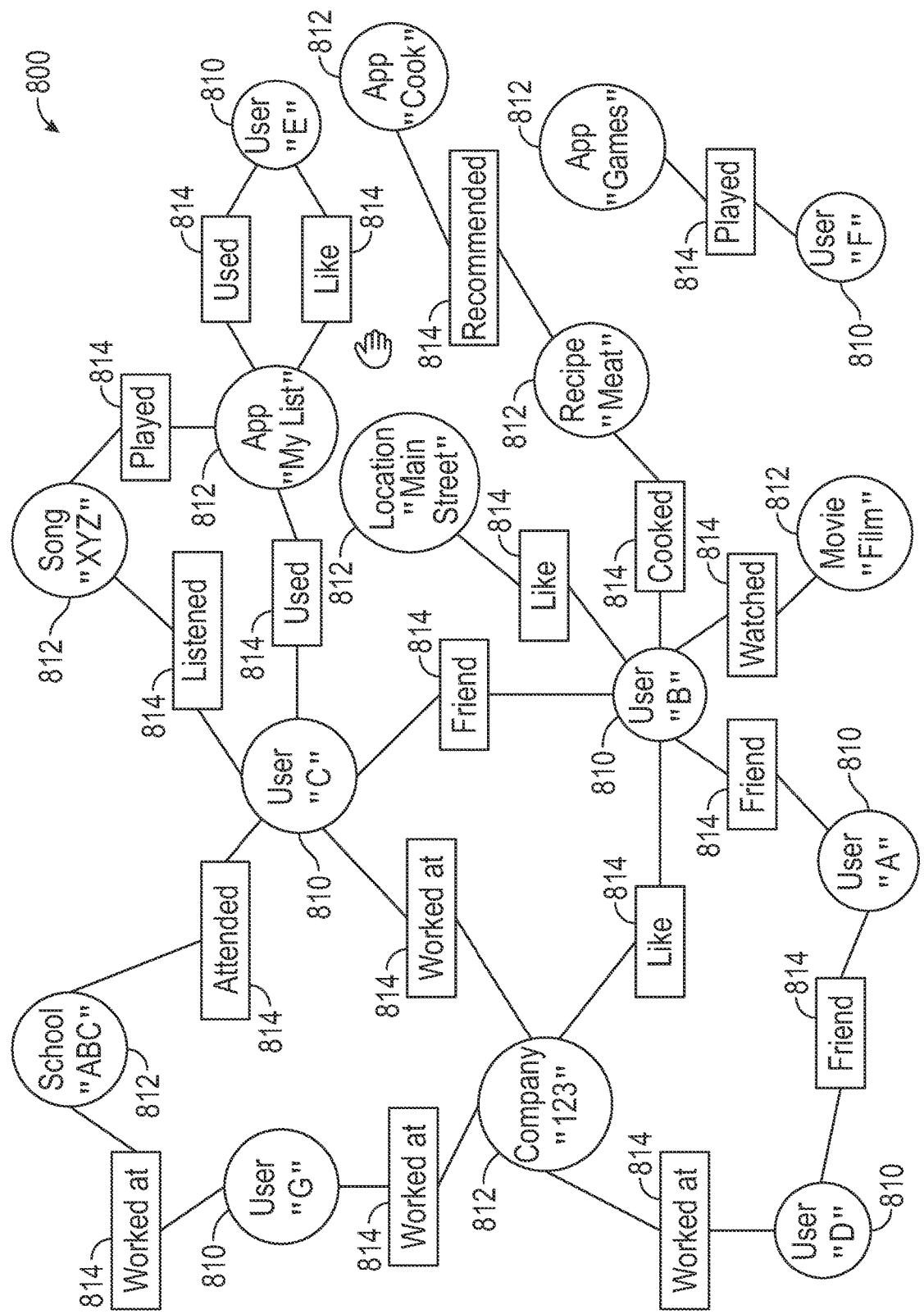
FIG. 8 illustrates an exemplary social graph for a social networking system, in accordance with one or more implementations of the present disclosure.

FIG. 8 illustrates exemplary social graph 800. In particular embodiments, social networking system 710 may store one or more social graphs 800 in one or more data stores. In particular embodiments, social graph 800 may include multiple nodes—which may include multiple user nodes 810 or multiple concept nodes 812—and multiple edges 814 connecting the nodes. Exemplary social graph 800 illustrated in FIG. 8 is shown, for didactic purposes, in a two-dimensional visual map representation. In particular embodiments, a social networking system 710, client system 714, or third-party system may access social graph 800 and related social-graph information for suitable applications. The nodes and edges of social graph 800 may be stored as data objects, for example, in a data store (such as a social-graph database). Such a data store may include one or more searchable or query able indexes of nodes or edges of social graph 800.

In particular embodiments, a user node 810 may correspond to a user of social networking system 710. As an example, and not by way of limitation, a user may be an individual (human user), an entity (e.g., an enterprise, business, or third-party application), or a group (e.g., of individuals or entities) that interacts or communicates with or over social networking system 710. In particular embodiments, when a user registers for an account with social networking system 710, social networking system 710 may create a user node 810 corresponding to the user and store the user node 810 in one or more data stores. Users and user nodes 810 described herein may, where appropriate, refer to registered users and user nodes 810 associated with registered users. In addition, or as an alternative, users and user nodes 810 described herein may, where appropriate, refer to users that have not registered with social networking system 710. In particular embodiments, a user node 810 may be associated with information provided by a user or information gathered by various systems, including social networking system 710. As an example, and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a username, the social networking system can access a user node corresponding to the username, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 812 may correspond to a concept. As an example and not by way of limitation, a concept may correspond to a place (such as, for example, a movie theater, restaurant, landmark, or city); a website (such as, for example, a website associated with social networking system 710 or a third-party website associated with a web-application server); an entity (such as, for example, a person, business, group, sports team, or celebrity); a resource (such as, for example, an audio file, video file, digital photo, text file, structured document, or application) which may be located within social networking system 710 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 812 may be associated with information of a concept provided by a user or information gathered by various systems, including social networking system 710. As an example, and not by way of limitation, information of a concept may include a name or a title; one or more images (e.g., an image of the cover page of a book); a location (e.g., an address or a geographical location); a web site (which may be associated with a URL); contact information (e.g., a phone number or an email address); other suitable concept information; or any suitable combination of such information. In particular embodiments, a concept node 812 may be associated with one or more data objects corresponding to information associated with concept node 812. In particular embodiments, a concept node 812 may correspond to one or more webpages.

In particular embodiments, a node in social graph 800 may represent or be represented by a webpage (which may be referred to as a "profile page"). Profile pages may be hosted by or accessible to social networking system 710. Profile pages may also be hosted on third-party websites associated with a third-party system. As an example, and not by way of limitation, a profile page corresponding to a particular external webpage may be the particular external webpage and the profile page may correspond to a particular concept node 812. Profile pages may be viewable by all or a selected subset of other users. As an example, and not by way of limitation, a user node 810 may have a corresponding user-profile page in which the corresponding user may add content, make declarations, or otherwise express himself or herself. As another example, and not by way of limitation, a concept node 812 may have a corresponding concept-profile page in which one or more users may add content, make declarations, or express themselves, particularly in relation to the concept corresponding to concept node 812.

In particular embodiments, a concept node 812 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example, and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 714 to send to social networking system 710 a message indicating the user's action. In response to the message, social networking system 710 may create an edge (e.g., an "eat" edge) between a user node 810 corresponding to the user and a concept node 812 corresponding to the third-party webpage or resource and store edge 814 in one or more data stores.

In particular embodiments, a pair of nodes in social graph 800 may be connected to each other by one or more edges 814. An edge 814 connecting a pair of nodes may represent a relationship between the pair of nodes. In particular embodiments, an edge 814 may include or represent one or more data objects or attributes corresponding to the relationship between a pair of nodes. As an example, and not by way of limitation, a first user may indicate that a second user is a "friend" of the first user. In response to this indication, social networking system 710 may send a "friend request" to the second user. If the second user confirms the "friend request," social networking system 710 may create an edge 814 connecting the first user's user node 810 to the second user's user node 810 in social graph 800 and store edge 814 as social-graph information in one or more of data stores. In FIG. 8, the exemplary social graph 800 includes an edge 814 indicating a friend relation between user nodes 810 of user "A" and user "B" and an edge indicating a friend relation between user nodes 810 of user "C" and user "B." Although this disclosure describes or illustrates particular edges 814 with particular attributes connecting particular user nodes 810, this disclosure contemplates any suitable edges 814 with any suitable attributes connecting user nodes 810. As an example, and not by way of limitation, an edge 814 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges 814.

In particular embodiments, an edge 814 between a user node 810 and a concept node 812 may represent a particular action or activity performed by a user associated with user node 810 toward a concept associated with a concept node 812. As an example, and not by way of limitation, as illustrated in FIG. 8, a user may "like," "attended," "played," "listened," "cooked," "worked at," or "watched" a concept, each of which may correspond to an edge type or subtype. A concept-profile page corresponding to a concept node 812 may include, for example, a selectable "check in" icon (such as, for example, a clickable "check in" icon) or a selectable "add to favorites" icon. Similarly, after a user clicks these icons, social networking system 710 may create a "favorite" edge or a "check in" edge in response to a user's action corresponding to a respective action. As another example, and not by way of limitation, a user (user "C") may listen to a particular song ("Ramble On") using a particular application (SPOTIFY, which is an online music application). In this case, social networking system 710 may create a "listened" edge 814 and a "used" edge (as illustrated in FIG. 8) between user nodes 810 corresponding to the user and concept nodes 812 corresponding to the song and application to indicate that the user listened to the song and used the application. Moreover, social networking system 810 may create a "played" edge 814 (as illustrated in FIG. 8) between concept nodes 812 corresponding to the song and the application to indicate that the particular song was played by the particular application. In this case, "played" edge 814 corresponds to an action performed by an external application (SPOTIFY) on an external audio file (the song "Imagine"). Although this disclosure describes particular edges 814 with particular attributes connecting user nodes 810 and concept nodes 812, this disclosure contemplates any suitable edges 814 with any suitable attributes connecting user nodes 810 and concept nodes 812. Moreover, although this disclosure describes edges between a user node 810 and a concept node 812 representing a single relationship, this disclosure contemplates edges between a user node 810 and a concept node 812 representing one or more relationships. As an example, and not by way of limitation, an edge 814 may represent both that a user likes and has used at a particular concept. Alternatively, another edge 814 may represent each type of relationship (or multiples of a single relationship) between a user node 810 and a concept node 812 (as illustrated in FIG. 8 between user node 810 for user "E" and concept node 812 for "SPOTIFY").

In particular embodiments, social networking system 710 may create an edge 814 between a user node 810 and a concept node 812 in social graph 800. As an example, and not by way of limitation, a user viewing a concept-profile page (such as, for example, by using a web browser or a special-purpose application hosted by the user's client system 714) may indicate that he or she likes the concept represented by the concept node 812 by clicking or selecting a "Like" icon, which may cause the user's client system 714 to send to social networking system 710 a message indicating the user's liking of the concept associated with the concept-profile page. In response to the message, social networking system 710 may create an edge 814 between user node 810 associated with the user and concept node 812, as illustrated by "like" edge 814 between the user and concept node 812. In particular embodiments, social networking system 710 may store an edge 814 in one or more data stores. In particular embodiments, an edge 814 may be automatically formed by social networking system 710 in response to a particular user action. As an example, and not by way of limitation, if a first user uploads a picture, watches a movie, or listens to a song, an edge 814 may be formed between user node 810 corresponding to the first user and concept nodes 812 corresponding to those concepts. Although this disclosure describes forming particular edges 814 in particular manners, this disclosure contemplates forming any suitable edges 814 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a newsfeed or ticker item on social networking system 710). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example, and not by way of limitation, advertisements may be included among the search results of a search-results page, where sponsored content is promoted over non-sponsored content.

In particular embodiments, an advertisement may be requested for display within social networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition, or as an alternative, an advertisement may be displayed within an application. An advertisement may be displayed within dedicated pages, requiring the user to interact with or watch the advertisement before the user may access a page or utilize an application. The user may, for example, view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 710 may execute or modify a particular action of the user.

An advertisement may also include social networking-system functionality that a user may interact with. As an example, and not by way of limitation, an advertisement may enable a user to "like" or otherwise endorse the advertisement by selecting an icon or link associated with endorsement. As another example, and not by way of limitation, an advertisement may enable a user to search (e.g., by executing a query) for content related to the advertiser. Similarly, a user may share the advertisement with another user (e.g., through social networking system 710) or RSVP (e.g., through social networking system 710) to an event associated with the advertisement. In addition, or as an alternative, an advertisement may include social networking-system context directed to the user. As an example, and not by way of limitation, an advertisement may display information about a friend of the user within social networking system 710 who has taken an action associated with the subject matter of the advertisement.

In particular embodiments, social networking system 710 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 710 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example, and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 710 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example, and not by way of limitation, particular user actions may be assigned both a rating and a weight while a relationship associated with the particular user action is assigned a rating and a correlating weight (e.g., so the weights total 90%). To calculate the coefficient of a user towards a particular object, the rating assigned to the user's actions may comprise, for example, 90% of the overall coefficient, while the relationship between the user and the object may comprise 40% of the overall coefficient. In particular embodiments, the social networking system 710 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example, and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 710 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 710 may calculate a coefficient based on a user's actions. Social networking system 710 may monitor such actions on the online social network, on a third-party system, on other suitable systems, or any combination thereof. Any suitable type of user actions may be tracked or monitored. Exemplary user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 710 may calculate a coefficient based on the user's actions with particular types of content. The content may be associated with the online social network, a third-party system, or another suitable system. The content may include users, profile pages, posts, news stories, headlines, instant messages, chat room conversations, emails, advertisements, pictures, video, music, other suitable objects, or any combination thereof. Social networking system 710 may analyze a user's actions to determine whether one or more of the actions indicate an affinity for subject matter, content, other users, and so forth. As an example, and not by way of limitation, if a user may make frequently posts content related to "coffee" or variants thereof, social networking system 710 may determine the user has a high coefficient with respect to the concept "coffee". Particular actions or types of actions may be assigned a higher weight and/or rating than other actions, which may affect the overall calculated coefficient. As an example, and not by way of limitation, if a first user emails a second user, the weight or the rating for the action may be higher than if the first user simply views the user-profile page for the second user.

In particular embodiments, social networking system 710 may calculate a coefficient based on the type of relationship between particular objects. Referencing the social graph 800, social networking system 710 may analyze the number and/or type of edges 814 connecting particular user nodes 810 and concept nodes 812 when calculating a coefficient. As an example, and not by way of limitation, user nodes 810 that are connected by a spouse-type edge (representing that the two users are married) may be assigned a higher coefficient than user nodes 810 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example, and not by way of limitation, if a user is tagged in first photo, but merely likes a second photo, social networking system 710 may determine that the user has a higher coefficient with respect to the first photo than the second photo because having a tagged-in-type relationship with content may be assigned a higher weight and/or rating than having a like-type relationship with content. In particular embodiments, social networking system 810 may calculate a coefficient for a first user based on the relationship one or more second users have with a particular object. In other words, the connections and coefficients other users have with an object may affect the first user's coefficient for the object. As an example, and not by way of limitation, if a first user is connected to or has a high coefficient for one or more second users, and those second users are connected to or have a high coefficient for a particular object, social networking system 710 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 800. As an example, and not by way of limitation, social-graph entities that are closer in the social graph 800 (i.e., fewer degrees of separation) may have a higher coefficient than entities that are further apart in the social graph 800.

In particular embodiments, social networking system 710 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 714 of the user). A first user may be more interested in other users or concepts that are closer to the first user. As an example, and not by way of limitation, if a user is one mile from an airport and two miles from a gas station, social networking system 710 may determine that the user has a higher coefficient for the airport than the gas station based on the proximity of the airport to the user.

In particular embodiments, social networking system 710 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 710 may provide information that is relevant to user's interests and current circumstances, increasing the likelihood that they will find such information of interest. In particular embodiments, social networking system 810 may generate content based on coefficient information. Content objects may be provided or selected based on coefficients specific to a user. As an example, and not by way of limitation, the coefficient may be used to generate media for the user, where the user may be presented with media for which the user has a high overall coefficient with respect to the media object. As another example, and not by way of limitation, the coefficient may be used to generate advertisements for the user, where the user may be presented with advertisements for which the user has a high overall coefficient with respect to the advertised object. In particular embodiments, social networking system 710 may generate search results based on coefficient information. Search results for a particular user may be scored or ranked based on the coefficient associated with the search results with respect to the querying user. As an example, and not by way of limitation, search results corresponding to objects with higher coefficients may be ranked higher on a search-results page than results corresponding to objects having lower coefficients.

In particular embodiments, social networking system 710 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system (e.g., via an API or other communication channel), or from another suitable system. In response to the request, social networking system 710 may calculate the coefficient (or access the coefficient information if it has previously been calculated and stored). In particular embodiments, social networking system 710 may measure an affinity with respect to a particular process. Different processes (both internal and external to the online social network) may request a coefficient for a particular object or set of objects. Social networking system 710 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. Pat. No. 8,402,094, issued Mar. 19, 2013 and U.S. Patent Publication No. 2012/0166532, filed Dec. 23, 2010 (now abandoned), each of which is incorporated herein by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example, and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example, and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated wit6ty9h the social-graph element, or content objects associated with the social-graph element can be accessed using the online social network. As an example, and not by way of limitation, a particular concept node 812 corresponding to a particular photo may have a privacy setting specifying that the photo may only be accessed by users tagged in the photo and their friends. In particular embodiments, privacy settings may allow users to opt in or opt out of having their actions logged by social networking system 710 or shared with other systems (e.g., third-party system). In particular embodiments, the privacy settings associated with an object may specify any suitable granularity of permitted access or denial of access. As an example, and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 710 may send a request to the data store for the object. The request may identify the user associated with the request and may only be sent to the user (or a client system 714 of the user) if the authorization server determines that the user is authorized to access the object based on the privacy settings associated with the object. If the requesting user is not authorized to access the object, the authorization server may prevent the requested object from being retrieved from the data store or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for providing feedback regarding augmented reality device content, the method comprising:
 detecting, via a sensor of an augmented reality device having an outwardly facing camera, that a user of the augmented reality device appears within content presented in a view area of the augmented reality device;
 responsive to detecting that the user of the augmented reality device appears within the content presented in the view area of the augmented reality device, determining an action being performed by the user;
 determining information from a first external data source, comprising supplemental data associated with the action being performed by the user, wherein the supplemental data comprises queried data from a second external data source about a different action related to the action being performed by the user; and
 responsive to determining the action being performed by the user, supplementing the content presented in the view area of the augmented reality device using information from the second external data source, wherein the supplementing the content includes providing a user interface for performing a user input with respect to the different action.

2. The computer-implemented method of claim 1, wherein the augmented reality device is a wearable, head-mounted augmented reality device.

3. The computer-implemented method of claim 1, wherein detecting, via the sensor of the augmented reality device that the user of the augmented reality device appears within the content presented in the view area of the augmented reality device comprises detecting, via the sensor of the augmented reality device, that the user of the augmented reality device is facing a reflective surface.

4. The computer-implemented method of claim 1, wherein supplementing the content presented in the view area of the augmented reality device comprises supplementing the content with guidance for at least one of improving and enhancing the action being performed by the user.

5. The computer-implemented method of claim 4, wherein supplementing the content presented in the view area of the augmented reality device comprises supplementing the content with at least one of textual content, audio content, and video content containing the guidance for the at least one of improving and enhancing the action being performed by the user.

6. The computer-implemented method of claim 1, wherein supplementing the content presented in the view area of the augmented reality device comprises supplementing the content with one or more facts regarding the action being performed by the user.

7. The computer-implemented method of claim 6, wherein supplementing the content presented in the view area of the augmented reality device comprises supplementing the content with at least one of textual content, audio content, and video content containing the one or more facts regarding the action being performed by the user.

8. The computer-implemented method of claim 1, wherein the supplemental data comprises one or more facts regarding the action being performed by the user.

9. A non-transient computer-readable storage medium having instructions embodied thereon, the instructions being executable by one or more processors to perform a method for providing feedback regarding augmented reality device content, the method comprising:
 detecting, via a sensor of a wearable, head-mounted augmented reality device having an outwardly facing camera, that a user of the wearable, head-mounted augmented reality device appears within content presented in a view area of the wearable, head-mounted augmented reality device;
 responsive to detecting that the user of the wearable, head-mounted augmented reality device appears within the content presented in the view area of the wearable, head-mounted augmented reality device, determining an action being performed by the user;
 determine information from a first external data source, comprising supplemental data associated with the action being performed by the user, wherein the supplemental data comprises queried data from a second external data source about a different action related to the action being performed by the user; and
 responsive to determining the action being performed by the user, supplement the content presented in the view area of the augmented reality device using information from the second external data source, wherein the supplementing the content includes providing a user interface for performing a user input with respect to the different action.

10. The non-transient computer-readable storage medium of claim 9, wherein detecting, via the sensor of the wearable, head-mounted augmented reality device, that the user of the wearable, head-mounted augmented reality device appears within the content presented in the view area of the wearable, head-mounted augmented reality device comprises detecting, via the sensor of the wearable, head-mounted augmented reality device, that the user of the wearable, head-mounted augmented reality device is facing a reflective surface.

11. The non-transient computer-readable storage medium of claim 9, wherein supplementing the content presented in the view area of the wearable, head-mounted augmented reality device comprises supplementing the content presented in the view area of the wearable, head-mounted augmented reality device with guidance for at least one of improving and enhancing the action being performed by the user.

12. The non-transient computer-readable storage medium of claim 9, wherein supplementing the content presented in the view area of the wearable, head-mounted augmented reality device comprises supplementing the content presented in the view area of the wearable, head-mounted augmented reality device with at least one of textual content, audio content, and video content containing guidance for the at least one of improving and enhancing the action being performed by the user.

13. The non-transient computer-readable storage medium of claim 9, supplementing the content presented in the view area of the wearable, head-mounted augmented reality device comprises supplementing the content presented in the view area of the wearable, head-mounted augmented reality device with one or more facts regarding the action being performed by the user.

14. A system, comprising:
 one or more processors configured to:
  detect, via a sensor of an augmented reality device having an outwardly facing camera, that a user of the augmented reality device appears within content presented in a view area of the augmented reality device;

responsive to detecting that the user of the augmented reality device appears within the content presented in the view area of the augmented reality device, determine an action being performed by the user;

determine information from a first external data source, comprising supplemental data associated with the action being performed by the user, wherein the supplemental data comprises queried data from a second external data source about a different action related to the action being performed by the user; and responsive to determining the action being performed by the user, supplement the content presented in the view area of the augmented reality device using information from the second external data source, wherein the supplementing the content includes providing a user interface for performing a user input with respect to the different action.

15. The system of claim 14, wherein the augmented reality device is a wearable, head-mounted augmented reality device.

16. The system of claim 14, wherein detecting, via the sensor of the augmented reality device that the user of the augmented reality device appears within the content presented in the view area of the augmented reality device comprises detecting, via the sensor of the augmented reality device, that the user of the augmented reality device is facing a reflective surface.

17. The system of claim 14, wherein supplementing the content presented in the view area of the augmented reality device comprises supplementing the content with guidance for at least one of improving and enhancing the action being performed by the user.

18. The system of claim 17, wherein supplementing the content presented in the view area of the augmented reality device comprises supplementing the content with at least one of textual content, audio content, and video content containing the guidance for the at least one of improving and enhancing the action being performed by the user.

19. The system of claim 14, wherein supplementing the content presented in the view area of the augmented reality device comprises supplementing the content with one or more facts regarding the action being performed by the user.

* * * * *